J. B. BUSHNELL.
GRAIN DRILL.
APPLICATION FILED JAN. 20, 1913.
1,171,925.
Patented Feb. 15, 1916.
2 SHEETS—SHEET 2.
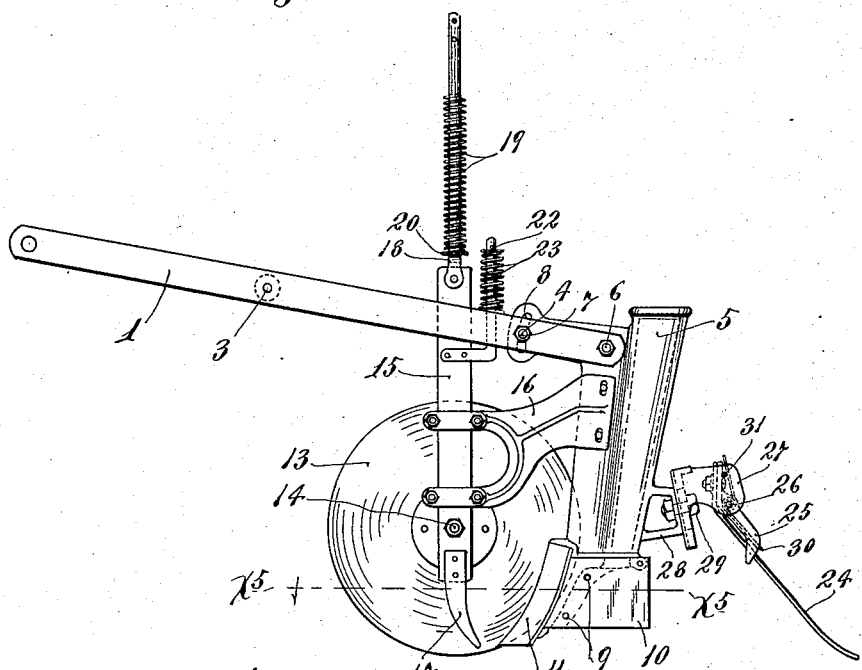
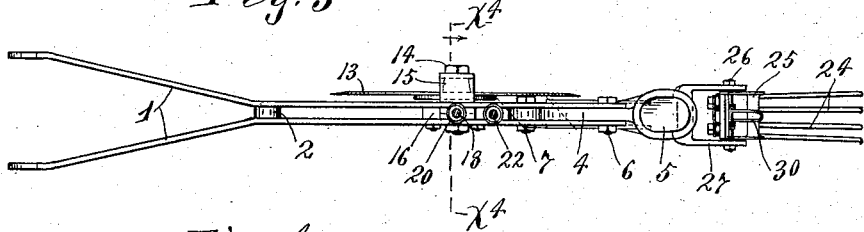
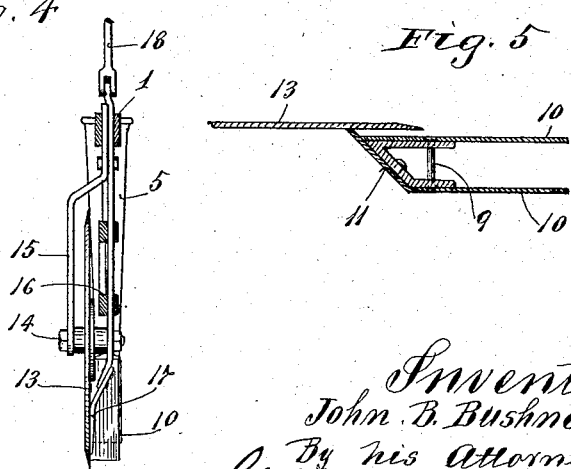
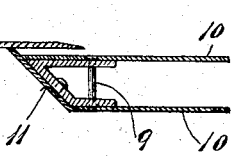
Witnesses.
A. H. Opsahl.
E. C. Skinkle.
Inventor
John B. Bushnell
By his Attorneys
Williamson Merchant

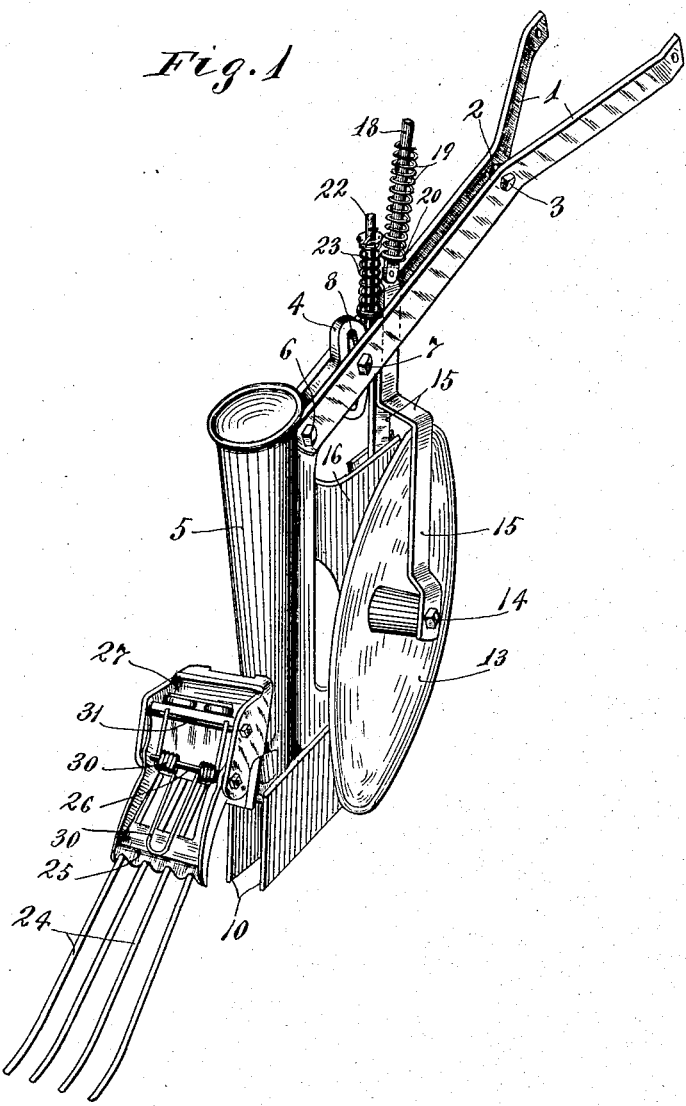

UNITED STATES PATENT OFFICE.

JOHN B. BUSHNELL, OF MINNEAPOLIS, MINNESOTA.

GRAIN-DRILL.

1,171,925. Specification of Letters Patent. Patented Feb. 15, 1916.

Application filed January 20, 1913. Serial No. 743,093.

*To all whom it may concern:*

Be it known that I, JOHN B. BUSHNELL, a citizen of the United States, residing at Minneapolis, in the county of Hennepin and State of Minnesota, have invented certain new and useful Improvements in Grain-Drills; and I do hereby declare the following to be a full, clear, and exact description of the invention, such as will enable others skilled in the art to which it appertains to make and use the same.

My present invention relates to grain drills or seeding machines having furrow opening and seed depositing devices, and has for its object to improve the same in the several particulars hereinafter described.

In some respects, the present invention is especially designed as an improvement on the grain drill disclosed and claimed in my prior United States Patent 1,031,167, of date, July 2, 1912, but it involves a covering and ground pulverizing device in the nature of a harrow attachment which is adapted for application generally to drills or seeding machines having seed legs or boots and furrow opening devices.

In the accompanying drawings which illustrate the invention, like characters indicate like parts throughout the several views.

Referring to the drawings, Figure 1 is a perspective view showing the complete furrow opener; Fig. 2 is a side elevation of the parts shown in Fig. 1; Fig. 3 is a plan view of the improved furrow opener; Fig. 4 is a view partly in front elevation and partly in vertical section on the line $x^4$—$x^4$ on Fig. 3; and Fig. 5 is a horizontal section taken on the line $x^5$—$x^5$ on Fig. 2.

The numeral 1 indicates a drag bar which, as shown, is made up of a pair of flat metal bars spaced apart by washers 2 and tied together by bolts 3. The members of the drag bar 1, at their rear ends, straddle a heavy draft lug 4 of a tubular seed leg or boot 5 and are pivotally connected to said lug by a bolt 6. Another nut-equipped bolt 7, passed through perforations in the two members of the drag bar 1 and through a segmental slot 8 in the lug 4, serves to rigidly connect the said leg 5 to the drag bar 1 with freedom for adjustments on the bolt 6. This adjustment is important, as will hereinafter appear. The lower end of the said boot 5 terminates in flanges 9 that are riveted or otherwise rigidly secured to approximately parallel flat laterally spaced so-called land side plates 10. The front edge of one land side plate 10 extends ahead of the other. and a forwardly and laterally inclined plow point plate 11 is riveted or otherwise rigidly secured to the front side of the lower end of the boot 5. The lower edge of this plow point plate 11 extends considerably below the horizontal lower edges of the land side plates 10. The downward extension of the plate 11 better adapts the shoe to enter the ground.

In connection with the shoe, I provide a sharp edged rolling colter, preferably in the form of a steel disk 13, journaled at 14 to the lower end of a supporting bar 15, mounted for vertical movements through suitable guides on a bearing bracket 16, which latter is riveted, cast or otherwise rigidly secured to the said leg 5. This flat disk 13 is located in a vertical plane that extends parallel to the line of draft, and its rear lower portion closely engages the plow point plate 11. The lower edge of the colter disk 13 should run below the lower edge of the plow point plate 11, so that it will cut through the ground and through obstructions such as corn stalks, leaving the shoe to form its own furrow. Otherwise stated, the furrow is not formed by the disk 13, but the said disk simply cuts through the ground at one side of the shoe, and leaves the shoe to form its own furrow. The inner face of the disk 13 will be partly cleaned by the plow point plate 11 of the shoe, but the main portion thereof is kept clean by a scraper 17, applied to the lower end of the supporting bar 15. A rod 18 attached to the upper end of the bar 15 is extended through the usual presser arm, not shown, and a coiled spring 19 on the said rod is compressed between the arm and a washer or collar 20 on said rod and yieldingly presses the bar 15, and hence, the colter 13 downward. The extreme downward movement of the disk 13 in respect to the shoe is limited by the lower end of the rod 18 that is engageable with one of the drawbars 1. Secured to the bar 15 is an upwardly extended rod 22. On this rod is a coiled spring 23 that exerts a downward pressure on the drag bar 1.

The tendency of the shoe to cut deep into the ground or to form a deep furrow may be increased by an adjustment increasing the angle between the drag bar 1 and the said leg 5, and conversely, this tendency may be decreased by a reverse adjustment, which adjustments are, of course, accomplished when the bolt 7 is loosened. It will be understood that, under equal downward pressure, the disk 13 will cut its way into the ground much more quickly than the shoe. This is the reason why there is a yielding connection provided between the bars 1 and 15, and hence, between said disk and shoe. With this arrangement, when the drill is first forced into contact with the ground, the disk will quickly enter the ground and the shoe will follow, and the same action will take place immediately after the drill has been raised by an obstruction in the ground.

The furrow formed by the shoe will have a level approximately flat bottom onto which the seed, deposited in the furrow, is scattered or spread out, and thus sowed at a perfectly uniform depth. The colter disk will cut through all trash such as corn stalks or small roots and thus prepare the ground for the passage of the shoe. In the arrangement illustrated, the bar 15 is bifurcated and the disk hub is journaled to the lower ends of the prongs thereof, but this construction, of course, may be varied. It is highly important to note that the plow point of the shoe works below the lower edge of the shoe and that the disk or colter works below the lower edge or end of the plow point. It is also, of course, important that the plow or plow point plate 11, especially at its lower portion, have a very close engagement with the disk, so that it will scrape dirt and other adhering matter from the disk and prevent it from working between the disk and plow point. Fig. 5 shows this close engagement between the elements 11 and 13. The projection of the plow point plate below the lower edge or bottom of the shoe proper is required to permit shoes having horizontal bottoms, to be pressed into the ground. With the disk arranged to cut below the lower end of the plow point, weeds or trash will be either cut through or depressed below the plow point, so that in either instance, they will not be caught and dug up by the plow point. The above noted relative arrangement of the parts 10, 11 and 13, is clearly shown in Fig. 2.

As a highly improved device for covering the furrow and pulverizing the ground, I employ a downwardly spring pressed fork which is pivotally connected to the said leg or boot, and operates somewhat like a sloping toothed harrow. The tines of the so-called cover fork are preferably in the form of light rods 24, the upper front ends of which are rigidly secured to a flange head 25 that is pivotally connected by a bolt 26, to a base bracket 27. This so-called base bracket 27 is secured to a lug 28 on the lower rear portion of the said leg 5, with freedom for vertical adjustments, as shown, by means of a nut-equipped bolt 29, the said bracket 26 having a vertical slot permitting such adjustments. On the hinge bolt 26 is a double coiled torsion spring 30 that reacts against the base bracket 27 and against the head 25 with a force that yieldingly holds the lower rear ends of the tines or rods 24 pressed into contact with the ground under the desired pressure. The extreme downward movement of the tines 24 and head 25 is, as shown, limited by a stop in the form of a bolt 31 passed through the flanges of the base bracket 27 and is engageable with flanges of the said head 25. Also, as shown, the ends of the spring 30 react against the said bolt 31. This arrangement of the spring and stop may, of course, be very greatly modified, but the general type of torsion spring is important, because the tension of the said spring is not varied much by the extreme movements imparted to the covering device or fork, due to irregularities in the ground surface. A covering device of this character will scrape the earth into the furrow and will pack the same below the surface, but will pulverize the ground and leave a loose finely pulverized top soil surface, such as is much desired in so-called dry farming; and, in fact, for all kinds of seeding.

This improved covering device or rather combined covering device and pulverizer is capable of use in connection with different kinds of furrow openers. For instance, it can be used in connection with ordinary shoe or hoe drills, or in connection with double or single disk drills or furrow openers having seed legs or boots through which the seed is delivered into the furrow.

What I claim is:

1. A furrow opener for seeding machines comprising a seed leg, a shoe at the lower end of said leg and constructed to form a furrow having an approximately flat bottom, and provided with a plow point extended obliquely backward from one side thereof, and a disk working against that side of the shoe from which said plow point extends obliquely, and extending below the bottom of said shoe.

2. A furrow opener for seeding machines comprising a seed leg, a shoe connected to the lower end of said leg and constructed to form a furrow having an approximately flat bottom, and provided with an oblique plow point plate projecting below the bottom of said shoe, in combination with a disk arranged to run in close engagement with said plow point plate with its lower edge projecting below the lower end of said plow point plate.

3. In an attachment for seeding machines, the combination with a drag bar, of a seed leg rigidly secured thereto and provided at its lower end with a shoe and having a forwardly projecting bearing, a disk support mounted for vertical movements in said forwardly projecting bearing, a disk journaled to said disk support, and a yielding connection between said disk support and drag bar.

4. In an attachment for seeding machines, the combination with a drag bar, of a seed leg rigidly secured thereto and provided at its lower end with a shoe and having a forwardly projecting bearing, a disk support mounted for vertical movements in said forwardly projecting bearing, a disk journaled to said disk support, a yielding connection between said disk support and drag bar, and a scraper applied to the lower end of said disk support and arranged to clean the lower portion of said disk.

In testimony whereof I affix my signature in presence of two witnesses.

JOHN B. BUSHNELL.

Witnesses:
BERNICE G. WHEELER,
HARRY D. KILGORE.

Copies of this patent may be obtained for five cents each, by addressing the "Commissioner of Patents, Washington, D. C."